Patented Apr. 27, 1948

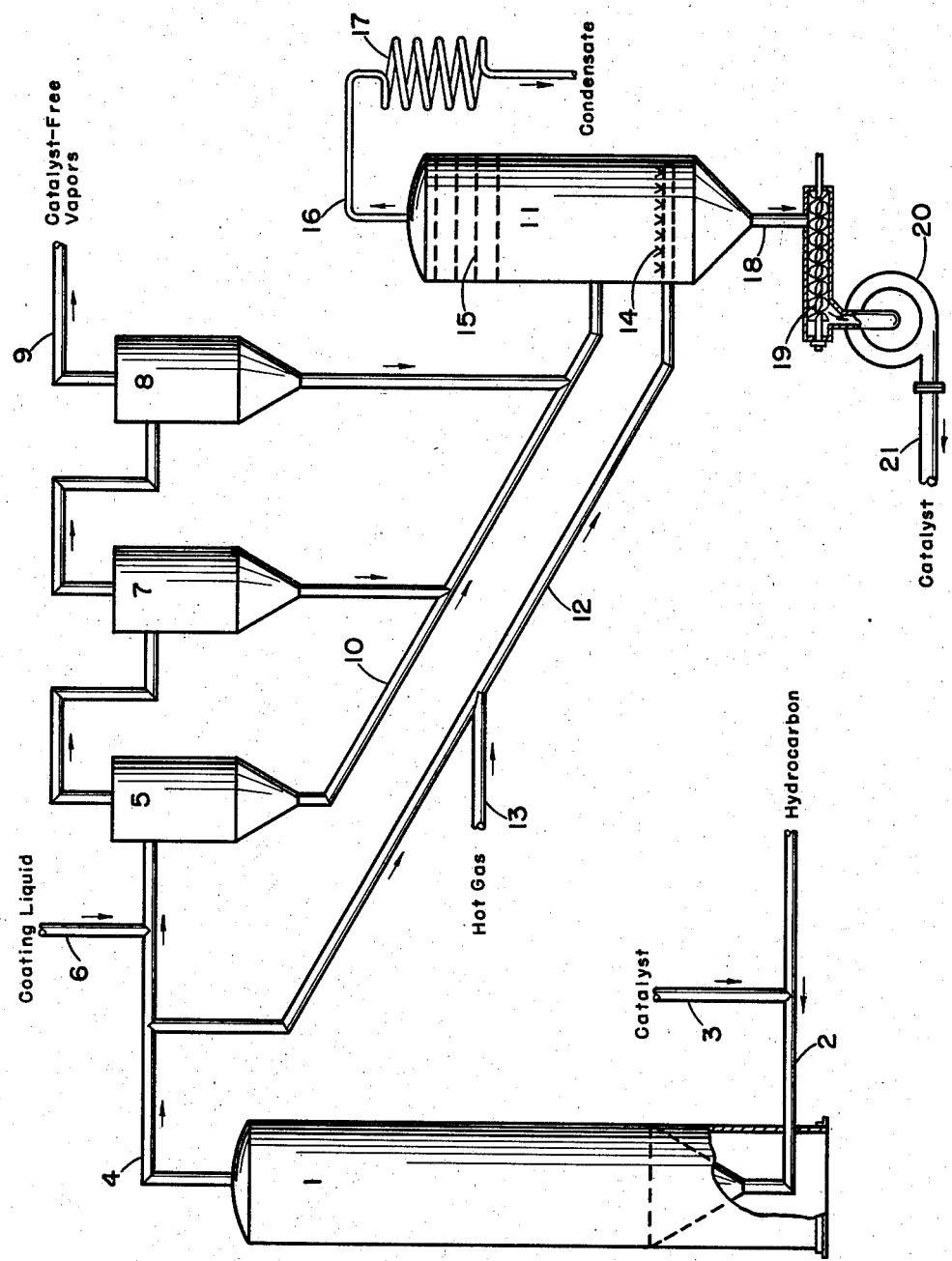

2,440,591

UNITED STATES PATENT OFFICE 2,440,591

METHOD FOR PREVENTING EROSION IN FLUIDIZED CATALYTIC CRACKING OF HYDROCARBONS

Warren K. Lewis, Cambridge, Mass., assignor to Standard Oil Development Company, a corporation of Delaware Application July 1, 1944, Serial No. 543,123

3 Claims. (Cl. 196—52)

The present invention is directed to catalytic cracking of the type which has come to be known as fluid catalyst cracking.

In fluid catalyst cracking the catalyst is carried through an elongated reactor in suspension in a stream of hydrocarbon vapor to be cracked, the catalyst being in suitably finely divided form for this purpose. The suspension of catalyst in hydrocarbon vapor passes from the reactor to separators, such as, cyclone separators, in which the catalyst is caused to settle out.

Difficulty has been experienced in this operation from the erosion of metal parts of the separators, which are usually cyclone separators, resulting from the impact of solid particles on these parts. The principal object of the present invention is the provision of a feature in this process which eliminates this difficulty.

According to the present invention a suspension of catalyst in hydrocarbon vapor on its way to the separator after leaving the reactor is sprayed or quenched with a liquid which coats the catalyst particles and cushions the impact of these particles upon metal parts of the separator. This coating step also facilitates separation of the catalyst from the hydrocarbon vapors. In carrying out the present invention in practice, the coated catalyst is then subjected to a treatment to remove its liquid coating. As a feature of the present invention this removal step is achieved by utilizing a portion of the hot vaporous reaction products from the reactor as a drying medium.

The nature and objects of the present invention will be more clearly understood from the following detailed description of the accompanying drawing in which the single figure is a front elevation in diagrammatic form of one embodiment thereof.

Referring to the drawing in detail, numeral 1 designates an elongated reactor into the bottom of which, through pipe 2, is introduced a suspension of finely divided catalyst in hydrocarbon vapors to be cracked, the catalyst being injected into line 2 through line 3 from a suitable hopper. The cracked vapors still carrying catalyst leave the top of the tower through line 4 and are discharged into a cyclone separator 5. Into line 4 ahead of separator 5 is sprayed or injected a catalyst-coating liquid through line 6. This liquid is introduced at a temperature such that it will reduce the temperature of the cracked vapors to a point below the boiling point of the coating liquid. Of course, a coating liquid boiling in the range of gas oil or lubricating oil can be utilized and this requires less preliminary cooling of the coating liquid. On the other hand, such a liquid is not as easily removed as a lower boiling liquid such as kerosene. This cooling liquid may be withdrawn as a cycle stream from the fractionating tower in which the product is ultimately fractionated, or it may be part of the fresh feed to the cracking unit itself. The coating liquid is not introduced in sufficient amount to make a slurry of the catalyst, but is preferably atomized into line 4 in the form of an extremely fine spray. The proper amount of this liquid to be employed will, of course, depend on the operating conditions in the unit itself and in each individual case may be readily ascertained by preliminary experiments.

The bulk of the catalyst is separated from the cracked product in separator 5 and the remaining vapors are passed in sequence through additional separators 7 and 8 from the latter of which the catalyst-free vapors pass through line 9 into suitable fractionating equipment. The precipitated catalyst from separators 5, 7, and 8 is conducted by stand pipe 10 into a drier 11 into the bottom of which is introduced, by way of line 12, part of the cracking effluent from reactor 1, line 12 being connected to line 4 ahead of branch line 6. If desired, a supplemental supply of hot gas may be introduced into line 12 through line 13. Line 12 terminates in the bottom of drier 11 in a suitable distributor or spray head 14. The drying medium is fed in at a sufficiently high velocity to keep the catalyst particles in suspension for a sufficient drying period. In some cases it may be desirable to install in the separator 11, between the distributing head 14 and the point of introduction of the coating catalyst, trays with scrapers of the type commonly used in Herreschoff furnaces. In the upper part of drier 11, screens 15 are provided to prevent the carry-over of catalyst by the drying medium which leaves the top of drier 11 through a line 16 connected with a condenser 17. The dried catalyst is discharged from the bottom of tower 11 through a suitable funnel 18 which feeds a worm conveyor 19 which forces the catalyst into a blower 20 having an outlet line 21 which may be connected both to the fresh catalyst hopper and to regenerating apparatus so that, if desired, the catalyst can be recycled in whole or in part before regeneration.

While in the specific embodiment described, the catalyst coating fluid is introduced into the line between the reactor and the cyclone separator, it will be apparent that the objective of the present invention can be realized in other ways. For example, a thin film of coating liquid can be maintained on those surfaces in the cyclone separator against which the catalyst particles impinge. This alternative requires the use of less coating liquid but it does not effect any quenching of the cracked products. In connection with this quenching effect obtained with the illustrated embodiment, it may be said that the temperature and the amount of the coating fluid introduced into line 6 may be such as to quench the cracked products to slightly below the dew point thereof at which point there will be a tendency for components which assume the liquid state to collect on the particles of suspended catalyst.

The nature and objects of the present invention having been thus described and illustrated, what is claimed as being new and useful and is desired to be secured by Letters Patent is:

1. In fluid catalyst cracking in which cracked effluent carrying suspended catalyst is introduced into a device for separating the catalyst from the cracked effluent the steps of coating the catalyst particles in said cracked effluent with a liquid prior to the entry thereof into the separating device, recovering coated catalyst particles from said separating device and subjecting them to a drying action to remove the coating liquid therefrom.

2. A method according to claim 1 in which the coated catalyst particles are dried by being passed countercurrent to a portion of the cracked effluent recovered from a point in the flow thereof ahead of the coating step.

3. A method according to claim 1 in which the coating liquid is applied to the catalyst particles by injecting into the cracked effluent at a point ahead of its entry into the separating device a cooling fluid in an amount sufficient to reduce the temperature of said cracked effluent to a temperature just below the dew point of the vapors contained therein.

WARREN K. LEWIS.

REFERENCES CITED

The following references are of record in the file of this patent:

UNITED STATES PATENTS

| Number | Name | Date |
|---|---|---|
| 2,300,151 | Hemminger I | Oct. 27, 1942 |
| 2,300,152 | Hemminger II | Oct. 27, 1942 |
| 2,303,047 | Hemminger | Nov. 24, 1942 |
| 2,303,680 | Brueckmann | Dec. 1, 1942 |
| 2,305,004 | Hemminger III | Dec. 15, 1942 |
| 2,366,805 | Richker | Jan. 9, 1945 |